United States Patent
Holland et al.

[11] Patent Number: 5,859,919
[45] Date of Patent: Jan. 12, 1999

[54] METHOD AND SYSTEM FOR MEASURING SURFACE ROUGHNESS USING FRACTAL DIMENSION VALUES

[75] Inventors: Orgal T. Holland, Spotsylvania; Wendy L. Poston, Fredericksburg, both of Va.

[73] Assignee: The United States of America as represented by the Secretary of the Navy, Washington, D.C.

[21] Appl. No.: 695,912

[22] Filed: Aug. 12, 1996

[51] Int. Cl.[6] ............................................. G06K 9/00
[52] U.S. Cl. ...................................... 382/108; 382/152
[58] Field of Search ................................. 382/108, 152, 382/154, 249; 356/376; 348/128

[56] References Cited

U.S. PATENT DOCUMENTS 5,444,795  8/1995  Tzoganakis ........................... 382/141
5,671,294  9/1997  Rogers et al. ......................... 382/228

*Primary Examiner*—Andrew W. Johns
*Attorney, Agent, or Firm*—James B. Bechtel, Esq.

[57] ABSTRACT

A method of measuring surface roughness is provided in which a video image of a surface area is formed and partitioned into a set of regions that cover the video image. Each region is of equal size. A fractal dimension value is calculated for each region. The fractal dimension values for the regions are averaged to form an average fractal dimension value associated with the particular region size. The steps of partitioning, calculating and averaging are repeated for additional set(s) of regions with each region from an additional set being of an equal and unique size. When all average fractal dimension values are plotted as a function of region size, a best-fit straight line is defined. A combination of the slope and y-intercept of the straight line is indicative of surface roughness of the surface area.

17 Claims, 3 Drawing Sheets

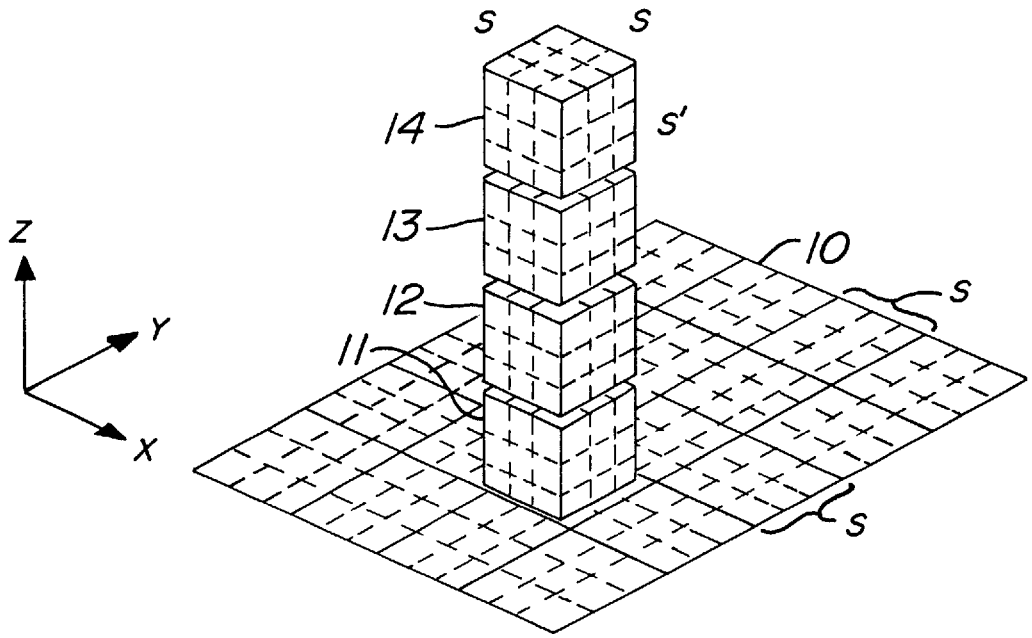
FIG. 1
FIG. 2
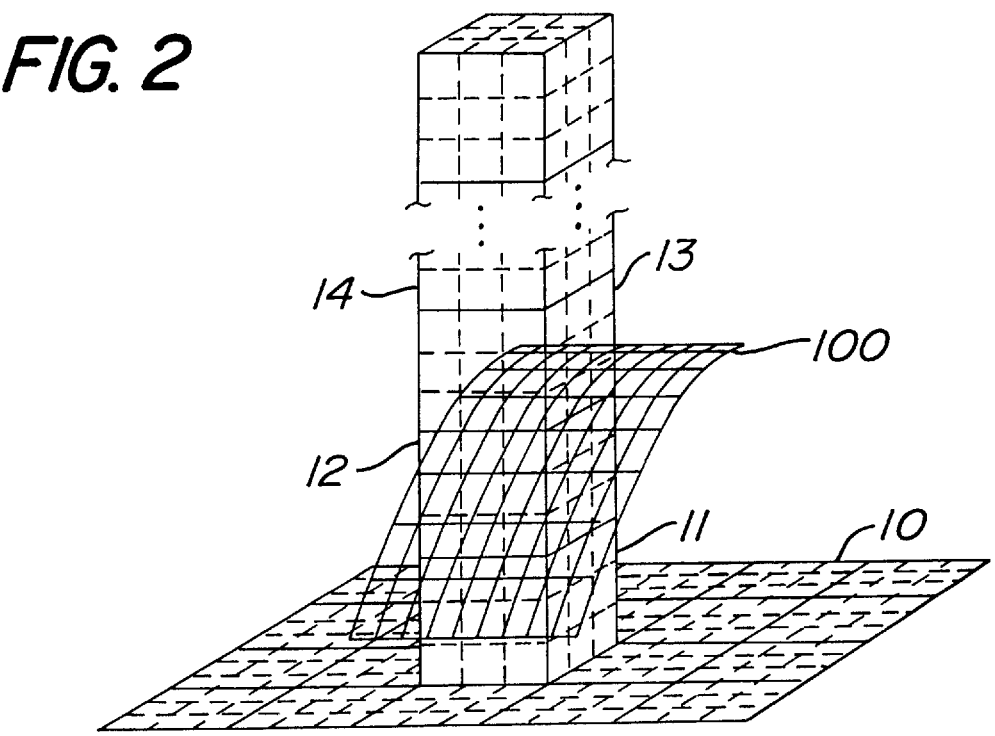

METHOD AND SYSTEM FOR MEASURING SURFACE ROUGHNESS USING FRACTAL DIMENSION VALUES

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to the assessment of surface roughness, and more particularly to a method and system for the measurement of surface roughness using fractal-based image processing.

BACKGROUND OF THE INVENTION

The complexity and precision requirements of mechanical products require improved methods of determining, producing and controlling the surface finish of both cast and machined items. Furthermore, increased production efficiency requirements and increasing rework costs demand accurate and consistent assessment of product quality. Surface roughness, or texture, is an important characteristic of both cast and machined products that describes the extent and average size of surface irregularities. Commonly expressed in micro inches, surface roughness is a measure of the arithmetical average deviation of surface irregularities from a hypothetical perfectly smooth surface and is typically denoted by $\mu AA$. Increasing manpower costs, increasingly competitive commercial environments and other cost saving measures, are challenging many traditional methods of evaluating surface roughness.

When a precise surface roughness measurement is required, the physical dimensions of surface irregularities can be measured using a profilometer, a device in which the deflection of a diamond tipped stylus is measured as it moves over a surface. The profilometer provides very accurate measurement of surface feature height, but only along a narrow sample of the surface. Thus, many measurements must be taken and averaged together to provide an assessment of surface roughness over an area. Such a procedure can be very time consuming and consequently prohibitively expensive in mass production applications. Finally, any physical contact device is impractical or impossible to use in applications where the product is made of soft materials that might be damaged by the stylus or where the geometry of the product prohibits its use.

Although surface roughness can be precisely measured using a profilometer, it is more common in many applications to determine surface texture by visually comparing the product surface with a known surface roughness standard. A commonly used standard is the Fowler Casting 52-725-334, which has casting samples of roughness measures from 32 to 2000 $\mu AA$. Visual comparison of a manufactured surface to a surface standard is a subjective human operation requiring trained experts to assess surface roughness. This approach produces inconsistent results that are dependent upon the experience, knowledge, fatigue level, etc., of the expert.

To save money, surface roughness evaluation often involves only a statistical sampling of a number of parts from a particular lot of manufactured parts. These samples are visually inspected by experts who have been trained to assess the surface finish and the occurrence of various abnormalities, such as porosity and voids, in the exposed surfaces. Such visual inspection is time consuming and can require destruction of the part in order for the inspector to view all critical surfaces. In addition, statistical sampling of casted lots does not provide a representative measure of an entire lot because there is no correlation between the casting process and various molds. Therefore, statistical independence can only be assumed as numerous external factors that affect the quality of the casting have not yet been controlled in such a fashion as to be correlated among the many separate molds that might be used in the manufacturing process. The inability to statistically predict the production quality of castings precipitates the requirement of 100% testing thereby ruling out any destructive test processes.

Surface roughness measurement devices based on the physical theories of light relating the angular distribution of scattered light to the topography of the surface (diffraction theory) do exist. However, this approach is useful only where the average roughness of the surface is much less than the wavelength of the incident radiation. Other optical and image processing methods that correlate the angular diffraction of scattered light and polarity changes of incident light to surface topography have been proposed but require the use of large and expensive optics.

SUMMARY OF THE INVENTION

Accordingly, it is an object of the present invention is to provide a method of measuring surface roughness.

Another object of the present invention is to provide a method of measuring surface roughness of an area in an objective manner.

Still another object of the present invention is to provide a method of measuring surface roughness without requiring any equipment to contact the surface.

Yet another object of the present invention is to provide a method of measuring surface roughness that can be implemented in a 100% testing environment in which no tested parts are destroyed.

Still another object of the present invention is to provide a method of measuring surface roughness that can be implemented to evaluate interior portions of machined or cast parts.

Still another object of the present invention is to provide a method of measuring surface roughness that can be implemented in an automated environment.

Other objects and advantages of the present invention will become more obvious hereinafter in the specification and drawings.

In accordance with the present invention, a method of measuring surface roughness is provided. A V×W video image of a surface area is formed and partitioned into a set of regions that cover the V×W video image. Each region is of equal size v×w with $v \leq V$ and $w \leq W$. A fractal dimension value is calculated for each region. The fractal dimension values for the regions are averaged to form an average fractal dimension value associated with the size v×w. The steps of partitioning, calculating and averaging are repeated for i additional sets of regions with each region from an i-th additional set being of an equal and unique size $v_i \times w_i$ where $v_i \leq V$ and $w_i \leq W$. As a result, i additional average fractal dimension values are formed. When the average fractal dimension value and the i additional average fractal dimension values are plotted as a function of size v×w and sizes $v_i \times w_i$, a best-fit straight line satisfying the equation y=mx+b is defined. A combination of slope m and y-intercept b is indicative of surface roughness of the surface area.

BRIEF DESCRIPTION OF THE DRAWINGS

FIG. 1 is a perspective view of image plane and gray scale intensity box partitioning in accordance with a particular prior art method of determining fractal dimension;

FIG. 2 is a perspective view of an image intensity surface at an (i,j)th partition of the image plane;

DETAILED DESCRIPTION OF THE INVENTION

Figure 3:
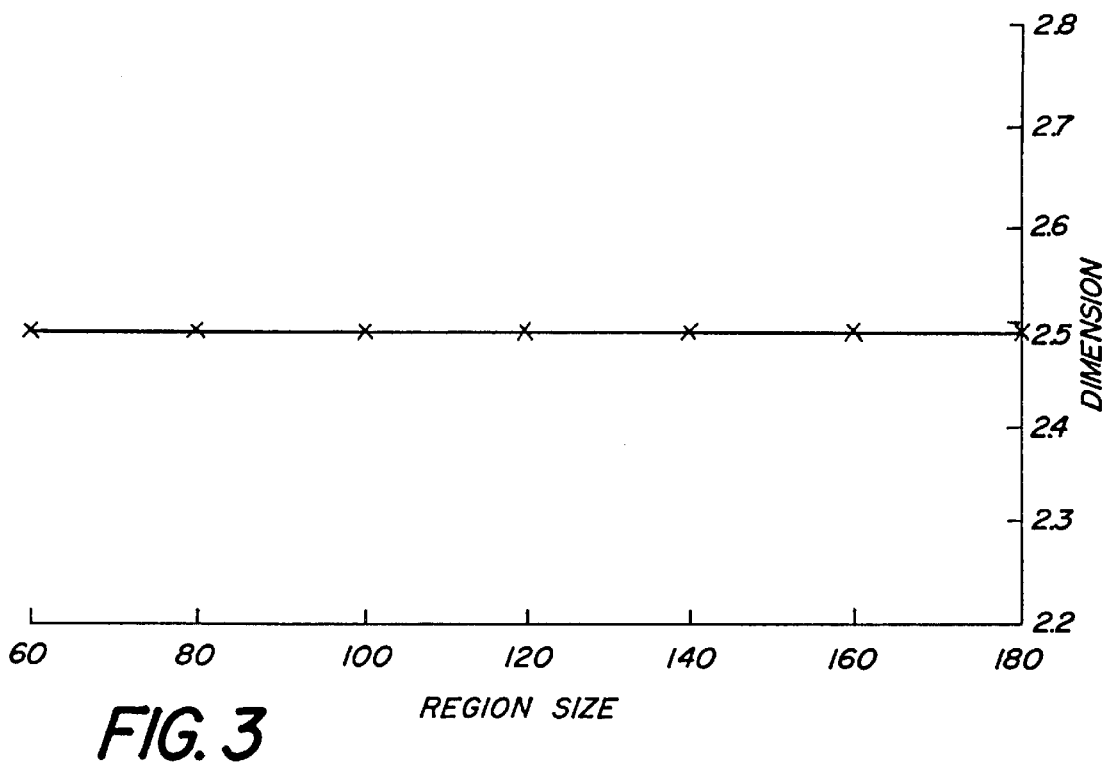
FIG. 3 is a plot of region size versus fractal dimension value for a surface known to have a surface roughness of 250 micro inches.

The method to assess surface roughness described below relies on texture determination related to image contrast using parameters related to fractal geometry. The method used here is based on the efficient computation of fractal dimension and the concept of lacunarity which relates texture to feature scale and distribution. Accordingly, to better understand the method, some background on the mathematics of fractal geometry will be discussed.

The fractal dimension D can be thought of as the fraction of a dimension that an object has. For example, the fractal dimension of a curve lies in the range $1 \leq D \leq 2$ and is indication of how close it is to appearing two dimensional. One can think of fractal dimension as indicating the roughness of a curve (the one dimensional case) or the texture in an image (the two dimensional case). Fractal dimension can also be thought of in terms of the self-similarity that is present in an object. A classic example of this is the limb of a tree very closely resembles the tree itself. Likewise, a branch resembles a limb, a twig a branch, etc. Although a limb is not an exact duplicate of the tree, it does look similar. Formally, it is said that there exists a statistical self-similarity.

Mathematically, statistical self-similarity is interpreted in the formalism of set theory. In this sense, a set is self-similar when it is the non-overlapping (i.e., disjoint) union of copies of itself. Typically these copies are scaled down by a common ratio r. This can be expressed as $$A = \bigcup_{i=1}^{N_r} a_i \qquad (1)$$

where $a_i$ is the scaled-down version of A, i.e., $(a_i \alpha A)$, $a_i \cap a_j$ for $i < j < N_r$, and $N_r$ is the number of scaled-down copies of set A contained in A. The fractal dimension D of A is given by $$D = \frac{\log(N_r)}{\log\left(\frac{1}{r}\right)} \qquad (2)$$

as is well known in the art.

In order to determine the fractal dimension D, a set of measurements of $N_r$ and r must be obtained. This set of measurements can then be used to solve equation (2) by linear regression. A number of methods are disclosed in the prior art to determine $N_r$ and r. By way of illustrative example, one such method that has been shown to be computationally efficient is disclosed by Sakar et al. in "An Efficient Approach to Estimate Fractal Dimension of Textural Images," Pattern Recognition, Vol. 25, No. 9, pp. 1035–1041, 1992, the teachings of which are incorporated herein by reference.

Briefly, in accordance with the teachings of Sakar et al., the x and y dimensions correspond to an M×M image (i.e., set A), so there are $M^2$ pixels. The z coordinate denotes the gray level of the pixel. Thus, the (x,y) pairs indicate the position in the image and the height of the surface indicates the gray level. Referring now to FIG. 1, the (x,y) pairs of the image plane 10 are partitioned into grids of size s×s as depicted by the solid lines where $1 < s \leq (M/2)$. An estimate for r is obtained for each value of s using $$r = s/M \qquad (3)$$

The z dimension is also partitioned into levels of height s'. The size of the levels is determined from $$\left\lfloor \frac{G}{s'} \right\rfloor = \left\lfloor \frac{M}{s} \right\rfloor \qquad (4)$$

where G is the number of gray-levels and the brackets denote the greatest integer function, i.e., the smallest integer greater than or equal to the quantity in the brackets. This imposes the same scale ratio in the z dimension as there is in each of the x,y dimensions. Thus the image, i.e., set A, is separated into scaled-down pieces as shown in FIG. 1.

This process can be pictured as taking a cube of size x,y,z and breaking it up into smaller cubes 11, 12, 13, 14 of size s×s×s'. Each cube (or level) above x-y image plane 10 is labeled with a number, with the first cube (i.e., cube 11) being closest to x-y image plane 10. Each cube denotes some interval of increasing gray level. Taking the (i,j)th partition in x-y image plane 10, the cube number associated with the minimum gray level is k and the cube number associated with the maximum gray level is l for the (i,j)th partition. For example, in FIG. 2, an image intensity surface 100 is shown as it appears at an (i,j)th partition of image plane 10. For intensity surface 100, the minimum gray level occurs at the first cube or cube 11 (k=1) while its maximum gray level occurs at the third cube or cube 13 (l=3). The value for $N_r$ is then calculated from the following, $$N_r = \sum_{i,j} n_r(i, j) \qquad (5)$$

where $$n_{r(i,j)} = l - k + 1 \qquad (6)$$

where $$n_{r(i,j)} = 1 - k + 1 \qquad (6)$$

This algorithm is repeated for different values of s, which yields the points needed for the estimation of the fractal dimension from equation (2). The fractal dimension D is solved using linear regression as is known in the art. This type of approach to determining fractal dimension from gray scale images is commonly called box-counting.

Textures can have the same fractal dimension and still look totally different. In "The Fractal Geometry of Nature" by Benoit B Mandelbrot, W. H. Freeman and Company, pp. 315–318, 1983, Mandelbrot identified a second order statistic distinct from fractal dimension called lacunarity which describes the relative spacing of features in an image. Lacunarity is a small value when the feature density is high as in the case of a smooth texture surface and is a large value when the feature density is relatively low as in the case of a coarse texture surface. Since the fractal dimension and lacunarity are statistically independent, they make good features for solving ambiguities.

One method of establishing lacunarity was proposed by Wu et al. in their paper "Texture Features for Classification of Ultrasonic Liver Images," Transactions on Medical Imaging, Vol. 11, No. 2, pp. 141–152, 1992. In Wu et al., a "multi-resolution" fractal feature vector is based on measures of fractal dimension at different scaling resolutions to establish lacunarity used in classifying ultrasound images of diseased liver tissue. Each scaled down resolution is a compressed image of the whole image. Computationally expensive image compression routines must be run prior to determining any fractal dimension. Thus, the approach of Wu et al. will either be time prohibitive if run on an affordable computer or cost prohibitive if run on a computer capable of quickly handling such data compression in a timely fashion.

The present approach can be used to indicate or classify surface roughness using gray-scale images of a surface area of the sample being inspected. To overcome the deficiencies of the prior art, the method of the present invention utilizes efficient methods of determining both fractal dimension and lacunarity. Briefly, the present invention applies the computational efficient method of determining fractal dimensions as disclosed by Sakar et al. To determine lacunarity efficiently, the present method evaluates average fractal dimension values developed from covering the video image with "windowed" portions of the image.

The present method is best understood by way of example. The first step involves forming a video image of the surface area to be evaluated. For purpose of illustration, it is assumed that the image is of dimensions V×W where V can (but need not) equal W. Typically, a fractal dimension value D is calculated for the entire V×W in a computationally efficient manner such as disclosed by Sakar et al. The video image is then partitioned into equally sized regions v×w where v<V and w<W. Thus, each region is some portion of the entire image so that a plurality of regions so sized are required to cover the entire video image. For example, when the video image is square, i.e., V=W, then each equally sized region can also be square such that v=w. The size of v and w can be selected such that adjoining regions partially overlap or abut one another as the entire image is covered. For example, if the entire video image were 200×200, partitioning could be such that v=w=50 thereby resulting in four equal and abutting regions. The regions could also be selected so that overlapping would occur at the edges. For example, if v=w=60 for a 200×200 video image, some overlapping will have to occur in order to cover the entire video image. The need for overlapping decreases as the homogeneity of the surface increases.

A fractal dimension is calculated for each identically-sized region used to cover the entire video image. These fractal dimensions are then averaged to define an average fractal dimension value that is associated with the particularly sized region. This process is repeated for a variety of region sizes. As a result, a feature set is developed and includes the various sizes of the regions and the associated (average) fractal dimension value. A plot of the feature set is used as an indication or classifier of surface roughness.

By way of example, the present approach is illustrated by considering images of a sample with known surface roughness of 250 micro inches. A video image was acquired at 256 levels of gray for a video display formed by 180×180 pixels. The fractal dimension value was first calculated (using the method of Sakar et al.) for the entire 180×180 image. A variety of region sizes (e.g., 60×60, 80×80, 100×100, 120×120, 140×140 and 160×160) were then selected and used to calculate an average fractal dimension value for each region size. As mentioned above, the average is developed by calculating a fractal dimension value for each region during the covering of the entire video image.

The fractal dimension of the entire image and the six average fractal dimension values are plotted as a function of region size in FIG. 3. From lacunarity, an image demonstrating a high-degree of self-similarity or homogeneity should measure nearly the same fractal dimension across all region sizes as is evident in FIG. 3. In contrast, an image exhibiting little self-similarity will yield either increasing or decreasing measures of fractal dimension as a function of region size. Thus, the extent to which an image is self-similar or homogeneous is represented by the slope of the best-fit straight line through the average fractal dimension values for each region size.

The graph of FIG. 3 can be used as is to classify surface roughness in terms of acceptable or unacceptable based on where a sample's fractal dimension falls relative to the line in FIG. 3. If additional lines are developed for other samples of known surface roughness values, the present method can be used to provide an indication of the surface roughness value of a sample having an unknown surface roughness. As an example, the present approach was applied to samples having known surface roughness values of 32, 63, 125, 250, 500, 1000 and 2000 micro inches using the same region sizes described above. The resulting surface roughness lines are respectfully represented in FIG. 4 by lines 200, 201, 202, 203, 204, 205 and 206. From FIG. 4, it is apparent that surface roughness of a sample to be evaluated can be approximated by both the slope and y-intercept of the lines generated in accordance with the present invention.

Figure 4:
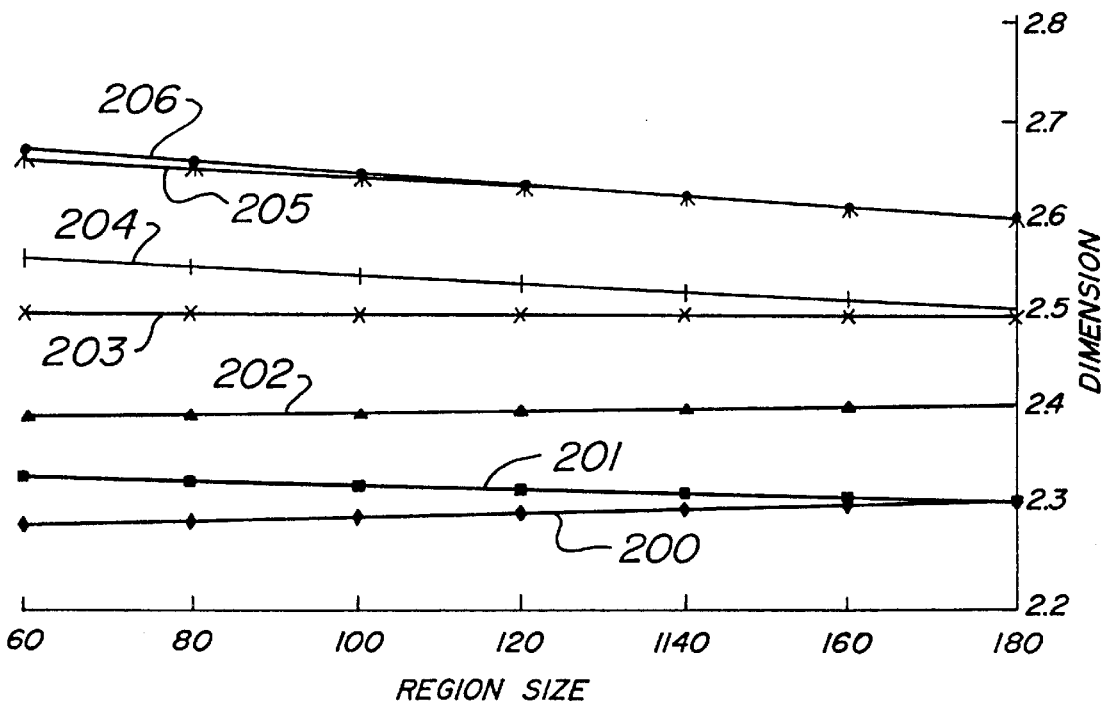
FIG. 4 is a plot of region size versus fractal dimension value for a plurality of surfaces with known surface roughness values.

The lines in FIG. 4 were developed by applying a best-fit straight line curve (i.e., a line satisfying the equation y=mx+b) in order to reduce the feature set to the y-intercept b (i.e., fractal dimension) and slope m (i.e., lacunarity). However, the present invention could also employ a polynomial curve-fit if the data points varied in that way. In such a case, the coefficients to the polynomial would be the features used for classification. However, note that a curve-fit results in a more computationally complex classifier and may provide no better performance than the simpler straight-line approach.

Figure 5:
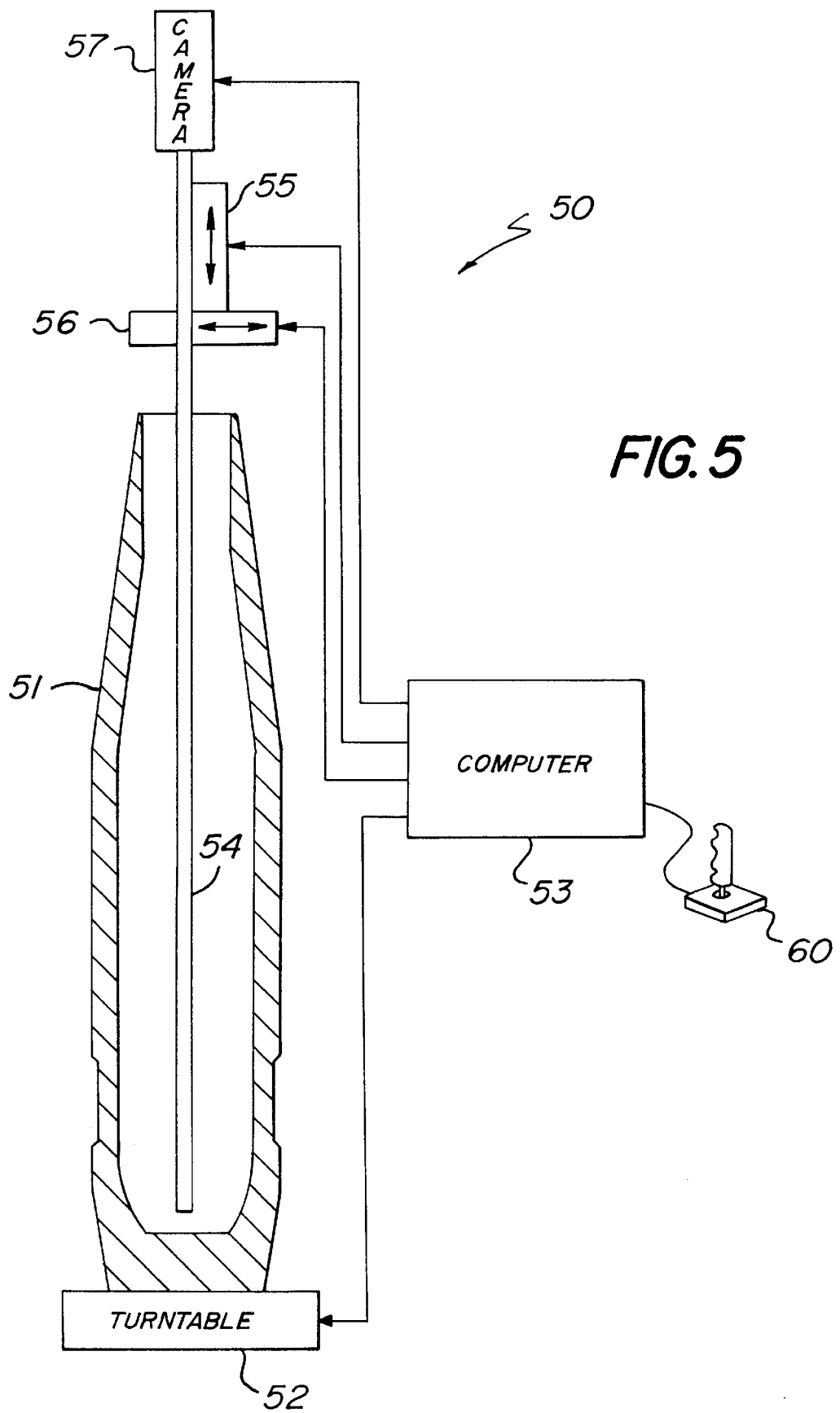
FIG. 5 is a schematic view of a system used to carry out the method of the present invention.

A system forming an inspection station to carry out the above described method is shown in FIG. 5 and referenced generally by numeral 50. The following briefly describes the intended features and operation of system 50. A (hollow) sample 51 which is to be examined is affixed to a turntable 52 which serves to precisely rotate sample 51 under control of a computer 53. A borescope 54 is inserted and extracted from the interior of sample 51 by means of a linear actuator 55 which is controlled by computer 53. A second linear actuator 56 positions the borescope 54 horizontally within sample 51 allowing for precise positioning of the borescope optics from the surface of interest. A high resolution camera 57 is attached to borescope 54 and provides close-up images of the surface being examined to computer 53. Computer 53 controls the vertical and horizontal linear actuators 55 and 56, camera 57 and turntable 52. A 3-axis joystick 60 provides a convenient user interface for manually adjusting the actuators and turntable during examination, initialization, or whenever the user wishes to manually locate a surface of interest.

In operation, sample 51 is placed on the computer controlled turntable 52. Borescope 54 is then positioned within (or outside of) sample 51 under the control of computer 53. Computer 53 incrementally positions borescope 54 through the depth of sample 51 and simultaneously rotates turntable 52, presenting to borescope 54 a sequence of partitioned views of the complete surface of the sample's interior (or exterior). Each view is imaged by camera 57 and processed by computer 53 as described above.

The method described herein for determining surface roughness has several advantages over traditional methods. The present method does not require contact with the surface and is therefore useful on a wide variety of materials, textures of fabrics, plastics, etc. The method assesses the surface roughness of an area as opposed to traditional profilometer methods which measure numerous surface heights in a line that must be averaged. Statistically, this means that the present method deals with the dependencies and similarities of features within a given area whereas profilometry does not. The method does not depend on human expertise, is not subject to human limitations, and lends itself well to automation.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of measuring surface roughness, comprising the steps of:

forming a V×W video image of a surface area;

calculating a fractal dimension value for each of a plurality of portions of said V×W video image, each of said plurality of portions defined by a size $v_i \times w_i$ with $v_i \leq V$, $w_i \leq W$, and i=1 to I where I is a whole number greater than or equal to 2 wherein, for each value of i, said size $v_i \times w_i$ is unique and wherein ones of said plurality of portions associated with said size $v_i \times w_i$ cover said V×W video image; and averaging said fractal dimension values for said ones of plurality of portions associated with each said size $v_i \times w_i$ to form an i-th average fractal dimension value for each said size $v_i \times w_i$, wherein said i-th average fractal dimension values plotted as a function of said sizes $v_i \times w_i$ define a best-fit straight line satisfying the equation y=mx+b where m is a slope of said best-fit straight line and b is a y-intercept of said best-fit straight line, wherein a combination of said slope and said y-intercept is indicative of surface roughness of said surface area.

2. A method according to claim 1 wherein $v_i = w_i$ for each value of i.

3. A method according to claim 1 wherein each of said ones of said plurality of portions associated with said size $v_i \times w_i$ define unique portions of said V×W video image.

4. A method according to claim 1 wherein portions of said ones of said plurality of portions associated with said size $v_i \times w_i$ overlap one another in covering said V×W video image.

5. A method according to claim 1 wherein said ones of said plurality of portions associated with said size $v_i \times w_i$ abut one another in covering said V×W video image.

6. A method of measuring surface roughness, comprising the steps of:

forming a V×W video image of a surface area;

partitioning said V×W video image into a set of regions that cover said V×W video image, each of said regions being of equal size v×w with $v \leq V$ and $w \leq W$;

calculating a fractal dimension value for each of said regions;

averaging said fractal dimension values for said regions to form an average fractal dimension value associated with said size v×w; and repeating said steps of partitioning, calculating and averaging for i additional sets of regions, each region from an i-th additional set being of an equal and unique size $v_i \times w_i$ with $v_i \leq V$ and $w_i \leq W$ to form i additional average fractal dimension values, wherein said average fractal dimension value and said i additional average fractal dimension values plotted as a function of said size v×w and said sizes $v_i \times w_i$ define a best-fit straight line satisfying the equation y=mx+b where m is a slope of said best-fit straight line and b is a y-intercept of said best-fit straight line, wherein a combination of said slope and said y-intercept is indicative of surface roughness of said surface area.

7. A method according to claim 6 wherein v=w and wherein $v_i = w_i$ for each value of i.

8. A method according to claim 6 wherein portions of said regions associated with said size v×w overlap one another in covering said V×W video image.

9. A method according to claim 6 wherein portions of said regions associated with said size v×w abut one another in covering said V×W video image.

10. A method according to claim 6 wherein portions of said regions associated with said size $v_i \times w_i$ overlap one another in covering said V×W video image.

11. A method according to claim 6 wherein portions of said regions associated with said size $v_i \times w_i$ abut one another in covering said V×W video image.

12. A method of measuring surface roughness, comprising the steps of:

forming a video image of a surface area, said video image being of size V×W;

calculating a fractal dimension value for said video image;

partitioning said video image into a set of regions that cover said video image, each of said regions being of equal size v×w with v<V and w<W;

calculating a fractal dimension value for each of said regions;

averaging said fractal dimension values for said regions to form an average fractal dimension value associated with said size v×w; and repeating said steps of partitioning, calculating and averaging for i additional sets of regions, each region from an i-th additional set being of an equal and unique size $v_i \times w_i$ with $v_i < V$ and $w_i < W$ to form i additional average fractal dimension values, wherein a plot of said fractal dimension value for said video image, said average fractal dimension value and said i additional average fractal dimension values as a function of a sequential ordering of said size V×W, said size v×w and said sizes $v_i \times w_i$ define a best-fit straight line satisfying the equation y=mx+b where m is a slope of said best-fit straight line and b is a y-intercept of said best-fit straight line, wherein a combination of said slope and said y-intercept is indicative of surface roughness of said surface area.

13. A method according to claim 12 wherein v=w and wherein $v_i=w_i$ for each value of i.

14. A method according to claim 12 wherein portions of said regions associated with said size v×w overlap one another in covering said video image.

15. A method according to claim 12 wherein portions of said regions associated with said size v×w abut one another in covering said video image.

16. A method according to claim 12 wherein portions of said regions associated with said size $v_i×w_i$ overlap one another in covering said video image.

17. A method according to claim 12 wherein portions of said regions associated with said size $v_i×w_i$ abut one another in covering said video image.

* * * * *